United States Patent [19]
Neyhart et al.

[11] 3,745,782
[45] July 17, 1973

[54] SLUDGE SEPARATION SYSTEMS EMPLOYING REFRIGERATION MEANS

[75] Inventors: Floyd B. Neyhart, Fayetteville; James S. Styron, North Syracuse, both of N.Y.

[73] Assignee: Carrier Corporation, Syracuse, N.Y.

[22] Filed: Mar. 2, 1972

[21] Appl. No.: 231,274

[52] U.S. Cl. .................... 62/159, 62/218, 62/324, 210/71
[51] Int. Cl. ........................................... F25b 29/00
[58] Field of Search .................. 62/159, 160, 196, 62/218, 324, 325; 210/71

[56] References Cited
UNITED STATES PATENTS

| | | | |
|---|---|---|---|
| 2,519,844 | 8/1950 | Mojonnier | 62/512 |
| 2,585,748 | 2/1952 | De Silvestro | 62/160 |
| 2,739,457 | 3/1956 | Chapman | 62/160 |

*Primary Examiner*—Meyer Perlin
*Attorney*—Harry G. Martin, Jr. and J. Raymond Curtin

[57] ABSTRACT

A sludge separation system, particularly of the type for promoting separation of alum sludge from the effluent of a potable water treatment plant, is provided with a pair of identical falling film heat exchangers wherein sludge is distributed to flow down the interior of the heat exchange tubes of one of the heat exchangers and a cooling medium is circulated through the interior of the tubes in the other heat exchanger. A refrigeration system is provided to freeze sludge in the one heat exchanger by evaporating the refrigerant on the exterior of the heat exchange tubes. The evaporated refrigerant is compressed and condensed on the exterior of the tubes in the other heat exchanger. Recirculation means for sludge is provided in order to continuously cool and solidify a thin film of the sludge descending in the heat exchange tubes of the one heat exchanger and a similar recirculation means is provided for recirculating cooling medium through the heat exchange tubes of the other heat exchanger. Periodically the refrigeration system is reversed, utilizing the cooling capacity of the frozen sludge in the heat exchange tubes of the one heat exchanger to condense refrigerant while freezing sludge in the heat exchange tubes of the other heat exchanger. Means are provided to supply the separated liquid component of the sludge as an additional cooling medium in the heat exchanger acting as a refrigerant condenser so that it is unnecessary to provide a separate condenser.

5 Claims, 1 Drawing Figure

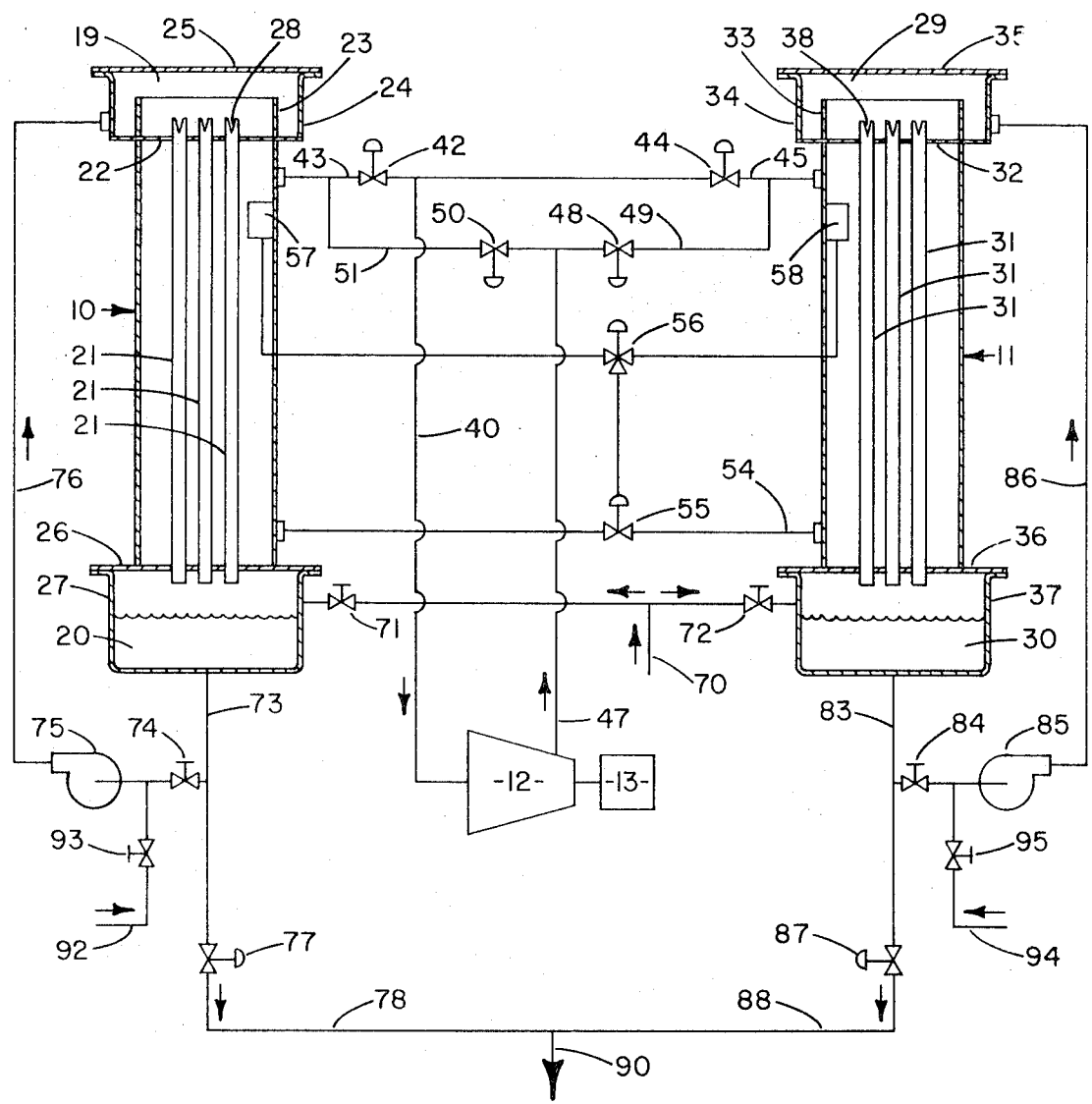

SLUDGE SEPARATION SYSTEMS EMPLOYING REFRIGERATION MEANS

BACKGROUND OF THE INVENTION

A number of processes result in an effluent aqueous medium having a suspension of coloidal size particles therein. For example, it is common to treat potable water supplies with a precipitating medium comprising aluminum slats and lime in order to remove suspended matter from the water. The resulting aluminum hydroxide forms a gelatinous precipitate which agglomerates and traps suspended coloidal particles, and which rapidly settles, thereby clarifying the water supply.

In the past, the resulting alum sludge has been allowed to settle from the clarified water and the sludge has either been returned to a lake or stream or it has been discharged to a permanent settling basin. However, the sludge does not de-water in a settling basin and these methods of disposal of the alum sludge are becoming unacceptable because of their effect on environmental pollution. A large volume of water is trapped in the resulting sludge and because of this, the disposal problem is enormous. Adequate sludge settling and disposal beds require and excessive amount of valuable land which is permanently desecrated. It has been known to barge the sludge far out into an ocean and dump it, but this is both expensive and ecologically undesirable.

Accordingly, some satisfactory means is required for concentrating the solid matter of alum sludges and other coloid-like suspensions so that their volume can be reduced and the waste disposed of in a more satisfactory manner.

One manner of promoting separation of the solid constituents of a suspended sludge from its liquid vehicle is by freezing the sludge. The precise mechanism by which freezing promotes separation is not entirely known, but it appears that once a sludge has undergone thorough freezing and remelting, the suspended particles rapidly settle out of the liquid.

In the past, attempts have been made to utilize freezing, but prior apparatus for accomplishing the freezing has been relatively inefficient. If sludge is frozen in a large mass, such as on the shell side of a heat exchanger, the sludge is stagnant during the freezing cycle, resulting in very low heat transfer coefficients and very low refrigerant evaporating temperatures. Also, when the frozen sludge thaws, it is turned to a liquid state which is again in a stagnant condition. This will result in poor condensing film coefficients and very high refrigerant condensing temperature. The falling film evaporators covered by this invention operate with liquid flow on the tube side of both evaporators so that high heat transfer coefficients are available for both the evaporator and the condenser portion of the refrigeration cycle. This results in compressor suction pressures much higher than are possible with prior apparatus and with compressor condensing pressures that are much lower than are possible with prior apparatus. The resultant operating economy presents a major operating cost improvement over prior apparatus. Furthermore, vessels heretofore used for freezing sludge were prone to failure due to the severe thermal expansion and contraction forces imposed on them. In addition, prior apparatus required separate condensers in addition to freezing vessels, which were used to condense refrigerant, resulting in relatively high capital expenditures, which made the process economically unattractive.

Accordingly, it is a principal object of this invention to provide an improved apparatus for promoting sludge separation which is capable of providing efficient freezing while overcoming the disadvantages of prior systems.

SUMMARY OF THE INVENTION

An apparatus for promoting separation of the solid and liquid constituents of a sludge is provided with a pair of identical falling film heat exchangers which alternately serve as a refrigerant evaporator and a refrigerant condenser. The heat exchangers comprise a plurality of vertically extending heat exchange tubes extending between an upper header and a lower header. Pump means are provided for circulating liquid from the lower headers to the upper headers. Sludge is withdrawn from the lower header of one of the heat exchangers and pumped to the upper header thereof, from which it is distributed to flow downwardly through the interior of the heat exchange tubes. Refrigerant evaporated on the exterior of the heat exchange tubes cools a film of downwardly flowing sludge and freezes it in a hollow cylindrical tube on the interior of the heat exchange tubes. The sludge is recirculated until the desired quantity of sludge is frozen on the interior of the heat exchange tubes. During this period of time, the other heat exchanger is employed as a refrigerant condenser. The cycle is then reversed and refrigerant is condensed on the exterior of the heat exchange tubes in which the sludge was frozen until the sludge is remelted. Preferably, the melted sludge is recirculated through the heat exchange tubes together with additional liquid to condense refrigerant on the exterior of the tubes while sludge is being frozen on the interior of the heat exchange tubes in the other heat exchanger.

The process provides improved refrigeration cycle efficiency because it is unnecessary to employ extremely low evaporator temperatures or high condenser temperatures due to the fact that a large solid mass of sludge is not being frozen. In addition, the thermal and mechanical stresses resulting from the freezing and thawing processes are not so great as to cause damage to the heat exchangers which overcomes a problem which has plagued prior systems. Furthermore, it is unnecessary to employ a separate condenser heat exchanger because of the provision made to recirculate sludge as well as other liquid in the heat exchanger serving as the refrigerant condenser. Consequently, capital cost is maintained relatively low and the operating economy substantially improved.

BRIEF DESCRIPTION OF THE DRAWING

The Drawing is a schematic illustration of a sludge separation apparatus in accordance with this invention.

DESCRIPTION OF THE PREFERRED EMBODIMENT

Referring to the drawing, the sludge separation apparatus includes a first heat exchanger 10, a second heat exchanger 11 and a refrigerant compressor 12 driven by a motor 13. First heat exchanger 10 is provided with an upper header 19 and a lower header 20 communicating with the open ends of a plurality of vertically disposed heat exchange tubes 21 secured in upper tube sheet 22 and lower tube sheet 26. A circular distributor plate 23 having a plurality of openings therein is radially inwardly spaced from cylindrical outer shell 24 of the heat exchanger to form an annular distributor for supplying liquid to the upper ends of heat exchanger tubes 21. Heat exchange tubes 21 may be provided with a plurality of V notches 28 or other means for promoting uniform flow of liquid from the liquid distributor into the interior of the heat exchanger tubes.

A bottom shell 27 forms the lower header which comprises a sludge tank in cooperation with lower tube sheet 26. While it is necessary for the interior or shell side of heat exchanger 10 to be sealed from communication with the atmosphere, it is not necessary that upper and lower headers 19 and 20 be completely sealed. It is preferred to provide a removable cover plate 25 to enclose upper header 19 and similarly lower shell 27 may be bolted to tube sheet 26 to make it easily removable for cleaning Heat exchanger 11 is identical in construction to heat exchanger 10 and comprises an upper header 29, a lower header 30, both communicating with a plurality of heat exchange tubes 31 which are secured to upper tube sheet 32 and lower tube sheet 36. A circular distributor plate 33, having apertures therein, forms an annular liquid distributor with outer shell 34 for distribution to the open upper ends of heat exchange tubes 31, provided with V notches 38. A cover plate 35 is provided to close upper header 29 and a bottom shell 37 is provided to form lower header 30.

A reversible refrigeration system is provided which includes compressor 12 and refrigerant passage 40 for selectively withdrawing refrigerant vapor from the shell side of either heat exhanger 10 or 11 and discharging it into the shell side of the other heat exchanger. Compressor 12 withdraws refrigerant vapor evaporated from the shell side of heat exchanger 10 through refrigerant passage 43 when valve 42 is open. Similarly, when valve 42 is closed and valve 44 is open, evaporated refrigerant is withdrawn from the shell side of heat exchanger 11 through passage 45. The refrigerant vapor compressed in compressor 12 is passed through refrigerant passage 47 to the shell side of the other heat exchanger which operates as a condenser. When valve 48 is open, the compressed refrigerant gas is discharged through refrigerant passage 49 into passage 45 from which it passes into the shell side of heat exchanger 11 and is condensed on the exterior surface of heat exchanger tubes 31. Similarly, when heat exchanger 11 operates as an evaporator, vale 48 is closed and refrigerant valve 50 opened so that compressed refrigerant vapor is passed through valve 50 and passages 51 and 43 into the shell side of heat exchanger 10 for condensation therein.

Condensed refrigerant passes through passage 54 and a refrigerant flow control valve 55 from the heat exchanger acting as a condenser into the heat exchanger acting as an evaporator. Suitable level sensors 57 and 58 are provided to sense the level of liquid refrigerant in the heat exchanger which is operating as an evaporator to govern control valve 56 which regulates refrigerant valve 55 to provide the desired refrigerant level.

A typical cycle of operation of the apparatus may be begun by opening valves 42, 48, 74, 84, 71 and closing valves 45, 50, 93, 95, 72, 77, 87. Raw sludge is provided to the apparatus by a suitable means and passes through sludge inlet passage 70 through valve 71 to admit a desired quantity of sludge into lower header 20.

Valve 71 is then closed and the sludge is circulated through passage 73, valve 74, pump 75 and passage 76 to upper header 19 of the heat exchanger. The sludge is metered and distributed by distributor baffle 23 so that it flows evenly into the upper ends of heat exchange tubes 21 and flows downwardly in a relatively thin film along the interior surface of the heat exchange tubes. Refrigerant evaporating at the exterior surface of heat exchange tubes 21 causes a portion of the sludge to freeze in a cylindrical tube on the interior surface of heat exchange tubes 21. The unfrozen sludge is collected in lower header 20 and is recirculated by pump 75 to upper header 19 until substantially all of the sludge, or the desired quantity thereof, has been frozen on the interior surface of the heat exchange tubes.

Refrigerant evaporating on the shell side of heat exchanger 10 cools the exterior surface of the heat exchange tubes and is withdrawn from the heat exchanger through passage 43, valve 42 and passage 40. The refrigerant vapor is compressed by compressor 12 and passes through refrigerant passage 47, valve 48 and passages 49 and 45 into the shell side of heat exchanger 11. The refrigerant vapor is condensed on the exterior surfaces of heat exchanger tubes 31 by the cooling action of a liquid heat exchange medium passed through the interior of the heat exchange tubes. The condensed refrigerant is then returned in the desired quantity through passage 54 through flow control valve 55 to the shell side of heat exchanger 10. In the event that heat exchange tubes 31 of heat exchanger 11 have a layer of frozen sludge on their interior, the hot compressed refrigerant vapor causes the sludge to melt and drop into lower header 30. At the same time, the melting action absorbs heat from the hot compressed refrigerant so that energy of the previous freezing cycle is recovered by condensing the refrigerant vapor. After all of the frozen sludge in heat exchange tubes 31 is melted, the liquid sludge continues to be recirculated by pump 85 through passages 83, valve 84 and passage 86 to upper header 29 where it continues to flow downwardly through heat exchange tubes 31. Additional cooling medium in the form of sludge, or preferably the separated liquid constituent thereof, may be supplied from a suitable location, such as a settling tank for previously frozen sludge, to the system through passage 94 and valve 95 in order to provide a cooling medium having additional cooling capacity to the condenser or to provide the entire cooling medium in the event that frozen sludge is not available or not desired in heat exchange tubes 31.

After the sludge is completely melted from heat exchange tubes 31, pump 85 is stopped and valve 87 is opened. The now liquid, previously frozen, sludge passes through valve 87 and sludge passage 88 and 90 where it is discharged to a settling tank or other suitable location to permit the rapid separation of suspended solid matter from the liquid vehicle.

The refrigeration cycle is then reversed by closing valve 42 and opening valve 44, closing valve 48 and opening valve 50, closing valve 71 and opening valve 72. Raw sludge is then supplied to lower header 30 of heat exchanger 11 and is frozen in a manner similar to that previously described, while heat exchanger 10 is employed as a condenser. After the frozen sludge is melted in heat exchanger 10, valve 77 is opened to discharge the melted sludge through passage 73, valve 77 and passages 78 and 90 to the settling tank, and the cycle is again reversed. Passage 92 and valve 93 may be used to supply cooling medium to heat exchanger 10 as previously described in connection with heat exchanger 11.

It will be seen that a system in accordance with this invention has numerous advantages over prior sludge separation systems. The use of a continuous falling film of liquid which is frozen on the interior surface of the heat exchange tubes makes it unnecessary to employ extremely low refrigeration temperatures because the quantity of sludge being frozen is confined to a relatively thin film rather than a large massive block which need be completely frozen. Prior processes which required the freezing of large stagnant masses of sludge required unnecessarily low freezing temperatures, because of poor heat transfer through the mass of freezing sludge, to assure complete freezing, and unnecessarily high condensing temperatures, thus consuming excessive energy in comparison to the present apparatus.

Furthermore, the heat exchangers of the present apparatus are not subject to excessive mechanical stresses due to the small thermal changes from freezing to thawing in the cycle which could cause damage. The hollow cylinder of frozen sludge can easily be thawed without damage to the heat exchange tubes. Furthermore, the apparatus does not require additional refrigerant condensers because the entire condensing operation may take place in the heat exchanger previously employed to freeze sludge, due to the provision of an auxiliary cooling medium supply. This not only recovers some of the refrigeration energy expended in freezing the sludge, but also minimizes capital cost of the system by avoiding the use of separate condensers.

Various control systems may be provided for the system described to automatically cycle the valves in accordance with the desired sequence and it will be apparent that such control systems may be operated by timers or temperature and pressure responsive controls as desired. While only a pair of heat exchangers have been illustrated for purposes of describing the invention, it will be appreciated that a large number of simultaneously operative freezing and condensing vessels may be employed and sequenced relative to each other in any desired manner.

The sludge separation system described herein is especially useful in promoting the rapid separation of the solid particles from the effluent sludge which results from a water purification plant. However, the system may also be utilized to promote the removal of any suspended coloidal-like matter from a liquid vehicle. For example, the effluent of an aluminum refinery includes a substantial quantity of iron oxide particles suspended in water. In the past, it has been difficult to separate iron oxide due to its relatively small particle size. The apparatus herein described provides a simple means for promoting the separation of the iron oxide particles from the water in which they are suspended so that it is unnecessary to pollute adjacent streams by discharge of the suspension therein. Another application of the invention herein described lies in the removal of suspended matter from sewage. It is difficult to promote rapid separation of a large amount of suspended matter from the discharge of sanitary sewage disposal plants. This apparatus provides a relatively inexpensive way of promoting rapid separation of the suspended matter so that the water discharged from a sewage treatment plant will be relatively free of contamination.

Accordingly, it will be appreciated that this invention may be otherwise embodied within the scope of the following claims.

We claim:

1. An apparatus for promoting the separation of the solid constituent of a sludge from the liquid constituent thereof which comprises:
   A. a first heat exchanger having a plurality of vertical tubes disposed within a shell, an upper header comprising a liquid distributor communicating with the upper ends of said heat exchange tubes and a lower header communicating with the lower ends of said heat exchange tubes;
   B. a second heat exchanger having a plurality of vertical tubes disposed within a shell, an upper header comprising a liquid distributor communicating with the upper ends of said heat exchange tubes and a lower header communicating with the lower ends of said heat exchanger tubes;
   C. a reversible refrigeration system comprising a refrigerant compressor for compressing a gaseous refrigerant, and refrigerant passage means including refrigerant control means for selectively withdrawing refrigerant vapor from the shell side of either one of said heat exchangers, compressing the refrigerant vapor in the compressor, discharging the compressed refrigerant vapor into the shell side of the other of said heat exchangers to condense the vapor, and for passing condensed refrigerant from said other heat exchanger to the shell side of said one heat exchanger for evaporation therein;
   D. sludge passage means including sludge control means for selectively passing raw sludge to the upper header of said one heat exchanger, for distribution and passage downwardly through the interior of the heat exchange tubes therein, in heat transfer relation with refrigerant evaporating on the exterior thereof, whereby a portion of the sludge is cooled and frozen on the inner surface of said heat exchanger tubes;
   E. recirculation passage means including a pump for recirculating liquid sludge from the lower header of said one heat exchanger to the upper header thereof to recirculate liquid sludge downwardly through the interior of the heat exchange tubes to freeze additional sludge therein;
   F. recirculation passage means including another pump for passing liquid from the lower header of the other of said heat exhangers and circulating it to the upper header thereof for passage downwardly through the heat exchange tubes therein until substantially all of any previously frozen sludge in said other heat exchanger is melted by condensing of refrigerant vapor on the exterior of the heat exchange tubes in said other heat exchanger; and
   G. passage means for passing melted sludge from said other heat exhanger to a location for settling of the solid particles from the liquid component of the sludge.

2. An apparatus for promoting the separation of the solid constituent of a sludge from the liquid constituent thereof as defined in claim 1, including passage means for passing a liquid heat exchange medium to the upper header of said other heat exchanger to provide a cooling medium to condense refrigerant vapor on the exterior of the heat exchange tubes in said other other heat exhanger.

3. An apparatus for promoting the separation of the solid constituent of a sludge from the liquid constituent thereof as defined in claim 1, including passage means for passing a separated liquid component of sludge into the upper header of said other heat exchanger for passage downwardly through the heat exchange tubes therein to supply liquid for removing heat from the refrigerant condensing on the exterior surface of the heat exchange tubes.

4. An apparatus for promoting the separation of the solid constituent of a sludge from the liquid constituent thereof as defined in claim 1, wherein said heat exchangers both have na annular liquid distributor in the upper headers thereof for distributing liquids into the upper ends of their respective heat exchange tubes.

5. An apparatus for promoting the separation of the solid constituent of a sludge from the liquid constituent thereof as defined in claim 1 wherein said refrigerant control means includes means responsive to the level of refrigerant in said one heat exchanger for controlling the passage of refrigerant from said other heat exchanger to said one heat exchanger.

* * * * *